United States Patent
Misra et al.

(10) Patent No.: US 6,934,879 B2
(45) Date of Patent: Aug. 23, 2005

(54) METHOD AND APPARATUS FOR BACKING UP AND RESTORING DATA FROM NONVOLATILE MEMORY

(75) Inventors: Manish Misra, Austin, TX (US); Suparna Sinha Roy, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 483 days.

(21) Appl. No.: 10/112,483

(22) Filed: Mar. 28, 2002

(65) Prior Publication Data

US 2003/0188220 A1 Oct. 2, 2003

(51) Int. Cl.$^7$ ............................................ G06F 11/00
(52) U.S. Cl. ........................................... 714/6; 714/22
(58) Field of Search ...................... 714/6, 22

(56) References Cited

U.S. PATENT DOCUMENTS 5,519,831 A * 5/1996 Holzhammer ................ 714/22

* cited by examiner

*Primary Examiner*—Bryce P. Bonzo
(74) *Attorney, Agent, or Firm*—Duke W. Yee; Mark E. McBurney; Theodore D. Fay, III

(57) ABSTRACT

A method, apparatus, and computer instructions for backing up data in a nonvolatile random access memory. Selected data is stored in the nonvolatile random access memory in available space in at least one electrically erasable programmable read only memory in the data processing system to form stored data. The stored data is used to restore the nonvolatile random access memory if nonvolatile random access memory becomes corrupted.

4 Claims, 3 Drawing Sheets

100 DATA PROCESSING SYSTEM

METHOD AND APPARATUS FOR BACKING UP AND RESTORING DATA FROM NONVOLATILE MEMORY

BACKGROUND OF THE INVENTION

1. Technical Field

The present invention relates generally to an improved data processing system, and in particular, to a method and apparatus for backing up and restoring data. Still more particularly, the present invention provides a method and apparatus for backing up and restoring data for a nonvolatile memory in a data processing system.

2. Description of Related Art

In data processing systems, nonvolatile memory is used to store data on a persistent basis. A nonvolatile memory is a memory that retains data written into it without power being applied to the memory. A hard disk drive is an example of a nonvolatile memory in a data processing system. A hard disk drive may be used to store many different types of data including programs, operating systems, databases, and images.

Another type of nonvolatile memory that is used in a data processing system is a nonvolatile random access memory (NVRAM). This type of memory is often used to store information, such as a boot list and environmental variables. Currently, if an NVRAM becomes corrupted during the booting of the operating system or at runtime, the only way to restore the contents of the NVRAM is to clear the NVRAM. Such a procedure, however, causes all of the initialized data and other information in the NVRAM to be lost because the NVRAM is reinitialized. As a result, at least one complete boot of the operating system is required to place the information back into the NVRAM.

Therefore, it would be advantageous to have an improved method, apparatus, and computer instructions for restoring an NVRAM that has become corrupted.

SUMMARY OF THE INVENTION

The present invention provides a method, apparatus, and computer instructions for backing up data in a nonvolatile random access memory (NVRAM). Selected data in the nonvolatile random access memory is stored in available space in at least one electrically erasable programmable read only memory (EEPROM) in the data processing system to form stored ata. The stored data is used to restore the nonvolatile random access memory if nonvolatile random access memory becomes corrupted.

BRIEF DESCRIPTION OF THE DRAWINGS

The novel features believed to be characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
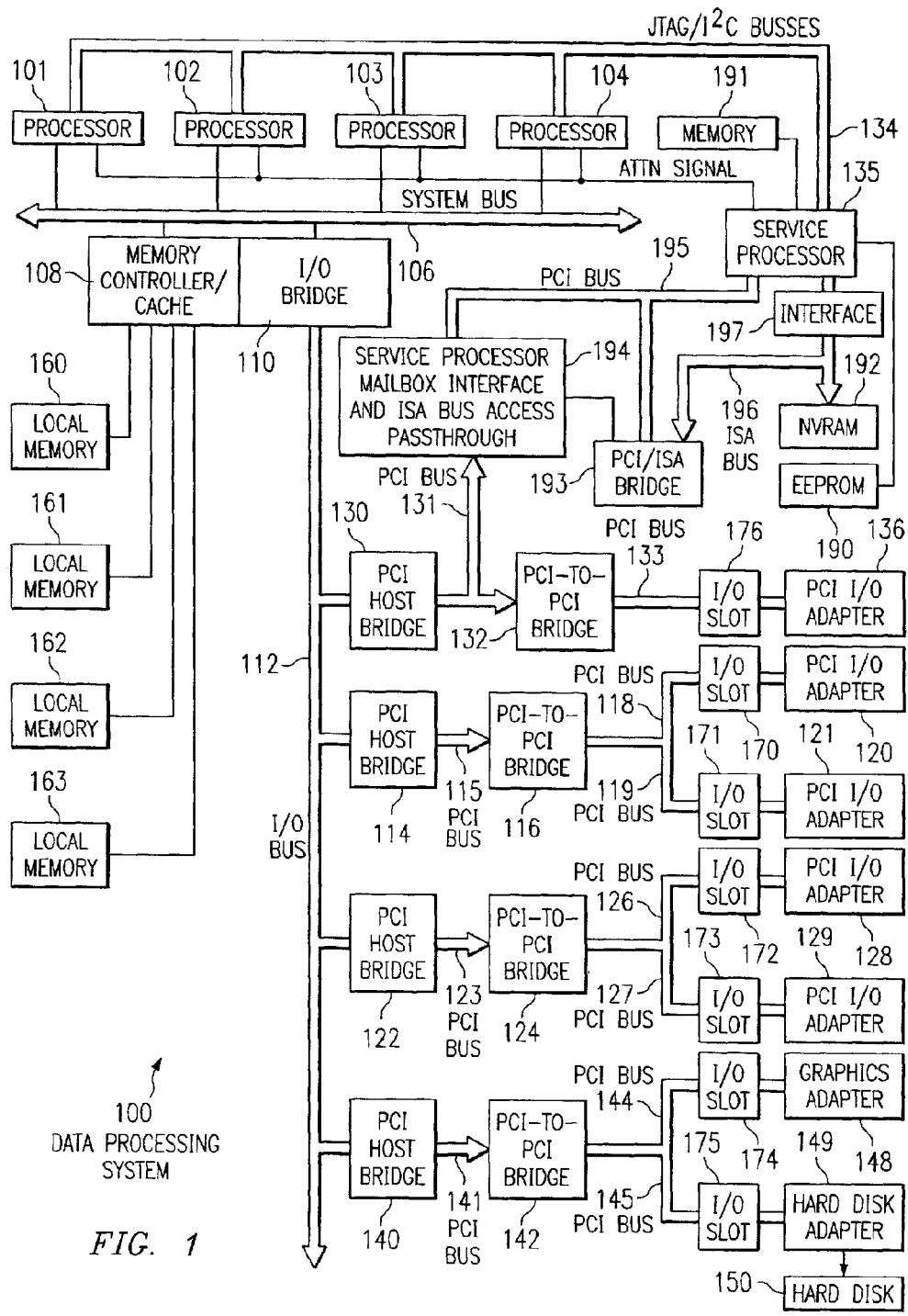
FIG. 1 is a block diagram of a data processing system in which the present invention may be implemented.

With reference to the figures now, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 may be a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and PCI I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P3. Windows 2000 is a product and trademark of Microsoft Corporation of Redmond, Wash.

Peripheral Component Interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface between PCI bus 126 and PCI bus 127. PCI I/O adapters 128 and 129 are placed into I/O slots 172 and 173, respectively. In this manner, additional I/O devices, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is connected to ISA bus 196 through interface 197. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of host processors 101, 102, 103, and 104 are connected together to an interrupt input signal of the service processor. Service processor 135 has an electrically erasable programmable read only memory (EEPROM) 190.

When data processing system 100 is initially powered up, service processor 135 uses the JTAG/I$^2$C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 101–104 for execution of the code loaded into host memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110. Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figures 2, 3:
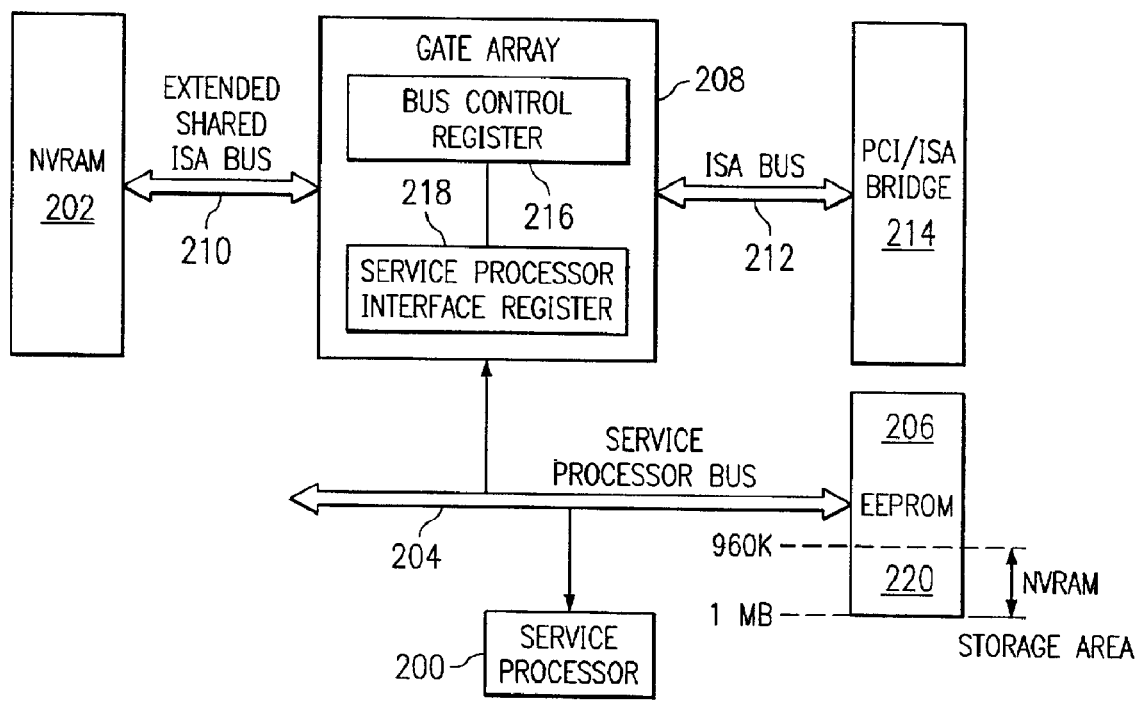
FIG. 2 is a diagram illustrating components used to backup and restore a nonvolatile random access memory (NVRAM) in accordance with a preferred embodiment of the present invention.
FIG. 3 is a diagram illustrating an example of the structure of an NVRAM in accordance with a preferred embodiment of the present invention.

Turning next to FIG. 2, a diagram illustrating components used to backup and restore a nonvolatile random access memory (NVRAM) is depicted in accordance with a preferred embodiment of the present invention. This diagram includes components from FIG. 1, which are involved in the backup and restoring of data in an NVRAM. In this example, service processor 200 performs backing up and restoring of data in NVRAM 202. Service processor 200 may be implemented as service processor 135 in FIG. 1 and NVRAM 202 may be implemented as NVRAM 192 in FIG. 1.

Service processor 200 is connected to service processor bus 204. EEPROM 206 is also connected to service processor bus 204. Gate array 208 provides an interface to service processor bus 204, extended shared ISA bus 210, and ISA bus 212. This gate array is implemented as interface 197 in FIG. 1. ISA bus 212 provides a connection to PCI/ISA bridge 214, which is implemented as PCI/ISA bridge 193 in FIG. 1. Gate array 208 includes bus control register 216 and service processor interface register 218. Bus control register 216 controls traffic to gate array 208 from extended shared ISA bus 210 and ISA bus 212. Service processor interface register 218 controls traffic to gate array 208 on service processor bus 204.

Service processor 200 executes instructions that are used to backup data from NVRAM 202 into storage area 220 in EEPROM 206. In this example, the data copied to EEPROM 206 includes only critical portions of NVRAM 202. These critical portions include data needed to boot up the data processing system. Booting an operating system involves causing the computer to start executing instructions. Most personal computers contain built-in instructions in an NVRAM, read only memory (ROM) or flash memory chip that are automatically executed on startup. These instructions search for the operating system, load the operating system, and pass control to the operating system.

Examples of data needed to successfully boot a data processing system include error log partitions, setup configurations, memory and CPU configuration records, and Vital Product Data (VPD). VPD are unique numbers associated with various hardware components in a data processing systems and help in identifying these components to software. The data copied to storage area 220 also may be all of the contents of NVRAM 202. In these examples, the data is read from NVRAM 202 using 256 byte reads, and data is stored in EEPROM 206 in blocks that are 256 or more bytes.

Referring to FIG. 3, a diagram illustrating an example of the structure of NVRAM 202 is depicted in accordance with a preferred embodiment of the present invention. In this example, NVRAM layout 300 includes implementation details 302, event scan log partition 304, error log partition 306, scan log partition 308, vital product data partition 310, CPU/memory record partition 312, common firmware 314, and setup configuration partition 316. Implementation details 302 in example NVRAM layout 300 may contain NVRAM Layout specific details. Event scan log partition 304 may have record of run time specific event. Error log partition 306 may have errors found during any time of IPL in the data processing system. Scan log partition 308 may have scan data collected by service processor 200 in FIG. 2 after unrecoverable errors. Vital product data partition 310 may store the component specific VPD under it which is collected by service processor 200 in FIG. 2. CPU/memory record partition 312 has Processor and Memory specific details. Common firmware 314 may be used for enviornmental monitoring details and communication details between various processor. Setup configuration partition 316 may have configuration parameters for network, boot and storage devices.

In this example, vital product data partition 310, CPU/memory record partition 312, common firmware 314, and setup configuration partition 316 are partitions in NVRAM 202 that are critical for a system boot. Additionally, NVRAM layout 300 also includes free partition 318, which may be used for other purposes, such as storing a service processor error log, storing firmware specific data, and serving as a sensor cache. Service processor 200 in FIG. 2 would only backup the critical partitions in NVRAM layout 300 to storage area 220 in EEPROM 206.

On the very first boot of the operating system, after which the mechanism of the present invention used for this backup is loaded, the critical data in NVRAM 202 is stored into storage area 220 in EEPROM 206. Service processor 200 performs this function by reading data from NVRAM 202 through extended shared ISA bus 210 from designated addresses in NVRAM 202. These addresses are identified by checking the available space on target EEPROM and are implementation specific. In these examples, data from vital product data partition 310, CPU/memory record partition 312, common firmware 314, and setup configuration partition 316 are read from NVRAM 202 and stored in storage area 220 in EEPROM 206. Although these examples illustrate the use of an EEPROM for the storage, other types of nonvolatile or persistent local storage accessible by service processor 200 also may be used to backup data from NVRAM 202. For example, a flash memory may be used instead of the EEPROM. Alternatively, other EEPROMs also may be used to store data from NVRAM 202. For example, other system or I/O planar EEPROMs may be used. In other words, EEPROMs located on a motherboard or on an I/O adapter may be used to backup data from NVRAM 202.

If a corruption of NVRAM 202 occurs, service processor 200 may restore the corrupted information in NVRAM 202 using the data backed up in storage area 220 in EEPROM 206. If NVRAM is corrupted, service processor 200 will first reinitialize the NVRAM and then restore the data to partitions which was backed up on EEPROM storage area 220. In this manner, the data may be restored to NVRAM 202 using internal storage, such as EEPROM 206.

Figure 4:
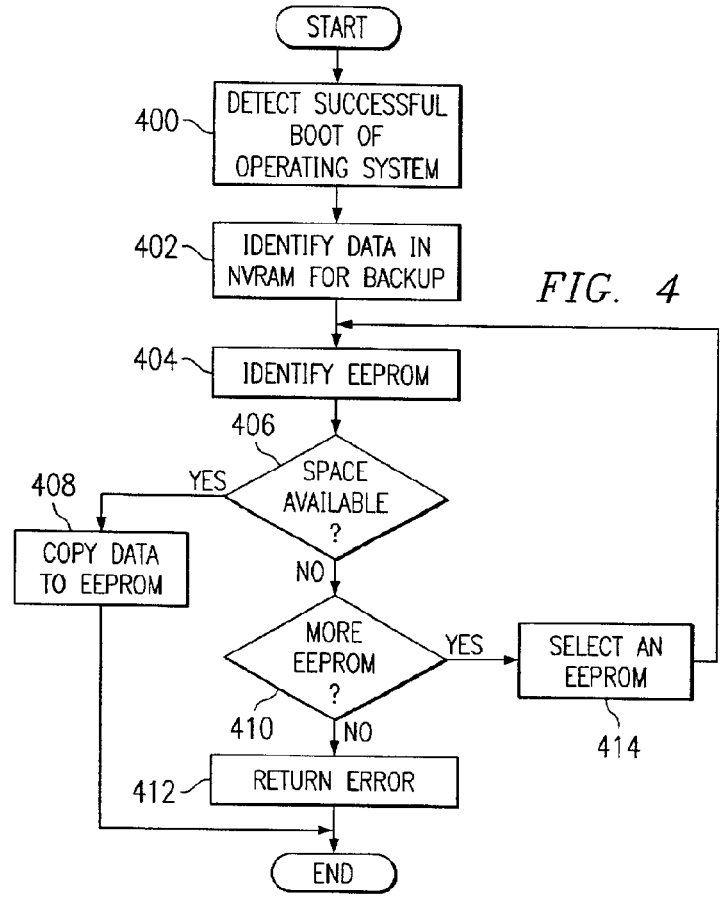
FIG. 4 is a flowchart of a process used to backup data from an NVRAM in accordance with a preferred embodiment of the present invention.

With reference now to FIG. 4, a flowchart of a process used to backup data from an NVRAM is depicted in accordance with a preferred embodiment of the present invention. The process illustrated in FIG. 4 may be implemented in a service processor, such as service processor 200 in FIG. 2. The process illustrated is one that may be performed upon the first successful boot to an operating system in a data processing system, after NVRAM is fully initialized.

The process begins by detecting a successful boot of the operating system (step 400). Data in the NVRAM is identified for backup (step 402). The data identified in these examples contains data that is critical for a successful boot of the data processing system. Of course, other data may be identified depending on the particular implementation. An EEPROM is identified (step 404). In most cases, the EEPROM used is one that is local to the service processor, such as EEPROM 206 in FIG. 2. Depending on the particular implementation, EEPROMs or nonvolatile memory located in the data processing system may be used.

Next, a determination is made as to whether space is available in the EEPROM to store the data from the NVRAM (step 406). This step is performed to ensure that sufficient space is available for the data to be copied to the EEPROM from the NVRAM. If space is available, the data is copied to the EEPROM (step 408) and the process terminates thereafter. The start address location of the memory sector in the EEPROM is based on a calculation of the total memory in the EEPROM and how much of this memory has already been used.

Returning again to step 406, if space is unavailable in the EEPROM, a determination is made as to whether more EEPROMs are present in the data processing system (step 410). In these examples, additional planar or I/O EEPROMs may be present. If additional EEPROMs are absent, an error is returned (step 412) and the process terminates thereafter. If additional EEPROMs are present, another EEPROM is selected (step 414) and the process returns to step 404 as described above.

Figure 5:
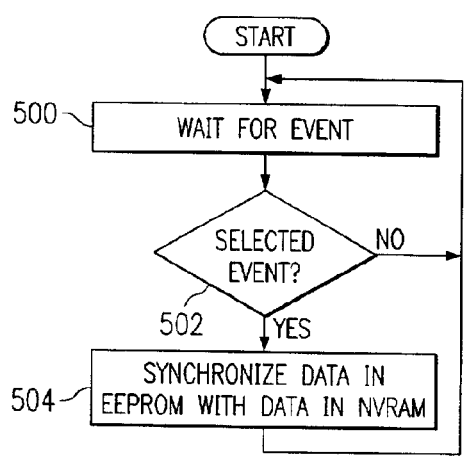
FIG. 5 is a flowchart of a process used for updating an EEPROM in accordance with a preferred embodiment of the present invention.

Turning now to FIG. 5, a flowchart of a process used for updating an EEPROM is depicted in accordance with a preferred embodiment of the present invention. The process illustrated in FIG. 5 may be implemented in a service processor, such as service processor 200 in FIG. 2.

The process begins by waiting for an event (step 500). The event may be a periodic or nonperiodic event depending on the particular implementation. Additionally, more than one type of event may be used to trigger the updating. A determination is made as to whether an event is a selected event (step 502). The selected event for updating the EEPROM may be, for example, each time the data processing system is booted, after the expiration of a selected time period, or on every power cycle of the data processing system. The selected period of time may be, for example, hourly or daily. Further, the events may be configured or selected by a user. If the event is a selected event for triggering updating of the EEPROM, the data in EEPROM is synchronized with data in the NVRAM (step 504) and the process returns to step 500 as described above.

Returning again to step 502, if an event is not a selected event, the process returns to step 500 as described above. Depending on the implementation, the information may be stored in multiple EEPROMs if no one EEPROM alone has sufficient space to store the data.

Figure 6:
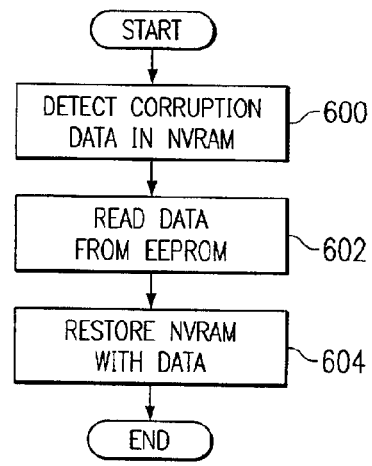
FIG. 6 is a flowchart of a process for restoring an NVRAM in accordance with a preferred embodiment of the present invention.

Turning now to FIG. 6, a flowchart of a process for restoring an NVRAM is depicted in accordance with a preferred embodiment of the present invention. The process illustrated in FIG. 6 may be implemented in a service processor, such as service processor 200 in FIG. 2.

The process begins by detecting corruption of data in the NVRAM (step 600). A corruption in NVRAM could be detected by calculating a checksum for the NVRAM data and then comparing it against a prestored checksum value. Thereafter, the data backed up in the EEPROM is read (step 602) and the data is then used to restore the NVRAM (step 604) with the process terminating thereafter. Data in each partition of NVRAM is preceded by a header, which is unique to each partition. While restoring the data from EEPROM to NVRAM, service processor reads this header information to determine which correct address and partition of NVRAM this data to be stored.

Thus, the present invention provides an improved method, apparatus, and computer implemented instructions for backing up and restoring an NVRAM. The mechanism of the present invention stores critical data from an NVRAM in an unused location on an EEPROM within the data processing system. This mechanism avoids having to reboot to the operating system one or more times to restore the data within the NVRAM. Further, the mechanism of the present invention also avoids having to use removable media, such as a floppy disk for storage of this information.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for backing up data in a nonvolatile random access memory; the method comprising:

storing selected data in the nonvolatile random access memory in available space in at least one electrically erasable programmable read only memory in the data processing system to form stored data; and using the stored data to restore the nonvolatile random access memory if nonvolatile random access memory becomes corrupted;

wherein the storing step occurs in response to a first successful boot of an operating system for the data processing system.

2. A method in a data processing system for backing up data in a nonvolatile random access memory; the method comprising:

storing selected data in the nonvolatile random access memory in available space in at least one electrically erasable programmable read only memory in the data processing system to form stored data; and using the stored data to restore the nonvolatile random access memory if nonvolatile random access memory becomes corrupted;

wherein the storing step includes updating the stored data in the at least one electrically erasable programmable read only memory in response to an event;

wherein the event is a power on of the data processing system.

3. A data processing system for backing up data in a nonvolatile random access memory; the data processing system comprising:

storing means for storing selected data in the nonvolatile random access memory in available space in at least one electrically erasable programmable read only memory in the data processing system to form stored data; and using means for using the stored data to restore the nonvolatile random access memory if nonvolatile random access memory becomes corrupted;

wherein the storing step occurs in response to a first successful boot of an operating system for the data processing system.

4. A data processing system for backing up data in a nonvolatile random access memory; the data processing system comprising:

storing means for storing selected data in the nonvolatile random access memory in available space in at least one electrically erasable programmable read only memory in the data processing system to form stored data; and using means for using the stored data to restore the nonvolatile random access memory if nonvolatile random access memory becomes corrupted;

wherein the storing means includes updating means for updating the stored data in the at least one electrically erasable programmable read only memory in response to an event;

wherein the event is a power on of the data processing system.

* * * * *